(12) United States Patent
Kraemer

(10) Patent No.: US 6,902,359 B2
(45) Date of Patent: Jun. 7, 2005

(54) DRILL INSERT WITH CONTROLLED CONTACT CLEARANCE

(75) Inventor: Rolf H. Kraemer, Edinboro, PA (US)

(73) Assignee: Allied Machine & Engineering Corp., Dover, OH (US)

( * ) Notice: Subject to any disclaimer, the term of this patent is extended or adjusted under 35 U.S.C. 154(b) by 159 days.

(21) Appl. No.: 10/395,029

(22) Filed: Mar. 21, 2003

(65) Prior Publication Data

US 2004/0184894 A1 Sep. 23, 2004

(51) Int. Cl.$^7$ ............................................. B23B 51/02
(52) U.S. Cl. ..................... 408/229; 408/227; 408/713
(58) Field of Search ........................ 408/227, 229, 408/230, 233, 713

(56) References Cited

U.S. PATENT DOCUMENTS

| | | | |
|---|---|---|---|
| 4,539,875 A | | 9/1985 | Lee et al. |
| 5,022,801 A | * | 6/1991 | Anthony et al. ............ 408/144 |
| 5,137,398 A | * | 8/1992 | Omori et al. ............... 408/145 |
| 5,443,337 A | * | 8/1995 | Katayama .................. 408/145 |
| 5,599,145 A | * | 2/1997 | Reinauer et al. ............ 408/233 |
| 6,135,681 A | * | 10/2000 | Nuzzi et al. ................ 408/227 |
| 6,270,298 B1 | * | 8/2001 | Colvin ....................... 408/227 |
| 6,371,702 B1 | * | 4/2002 | DeWald et al. ............. 408/227 |
| 6,629,805 B1 | * | 10/2003 | Eischeid ..................... 408/228 |
| 6,685,402 B2 | * | 2/2004 | Mast et al. ................. 408/227 |
| 2002/0098050 A1 | * | 7/2002 | Heule ........................ 408/227 |
| 2004/0001741 A1 | * | 1/2004 | Mast et al. ................. 408/233 |
| 2004/0223823 A1 | * | 11/2004 | Mast et al. ................. 408/227 |

* cited by examiner

*Primary Examiner*—Daniel W. Howell
*Assistant Examiner*—Michael W. Talbot
(74) *Attorney, Agent, or Firm*—Hahn Loeser & Parks, LLP; Robert J. Clark

(57) ABSTRACT

A cutting tool insert having a controlled contact clearance behind the cutting edge which limits flank wear and allows more coolant near the cutting edge further allowing an increase in surface speed, feed rates, and tool life. The controlled contact clearance surface provides a first wear zone and a second wear zone, the first wear zone generated during operation of the drill insert allows the flank wear distance to grow from zero to the distance from the cutting edge to the controlled contact clearance surface, the second wear zone keeps the flank wear distance substantially constant until the controlled contact clearance surface is substantially worn away.

21 Claims, 7 Drawing Sheets

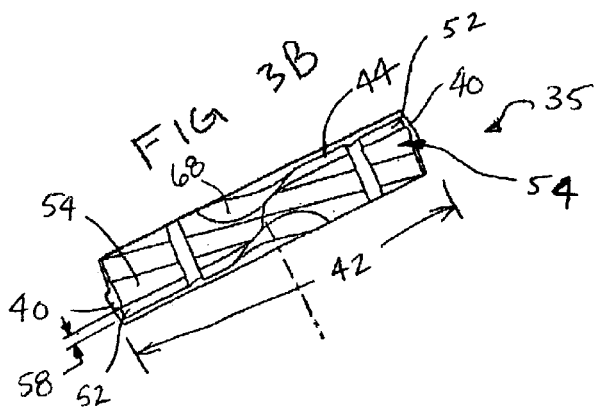
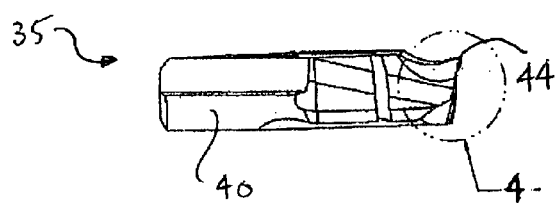
FIG 3C
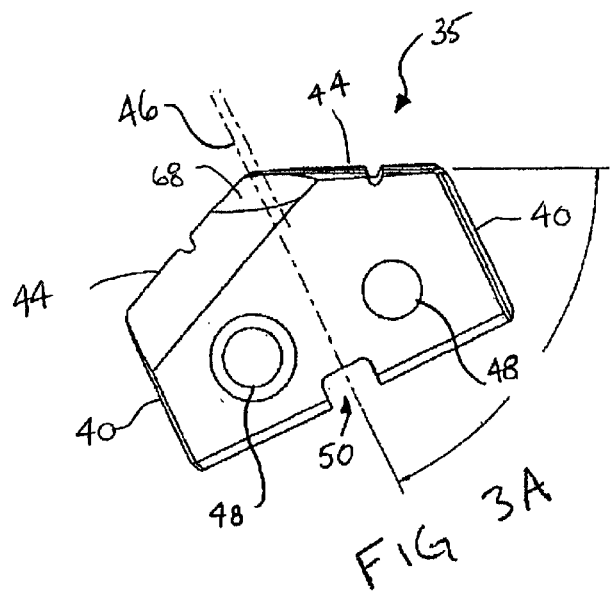

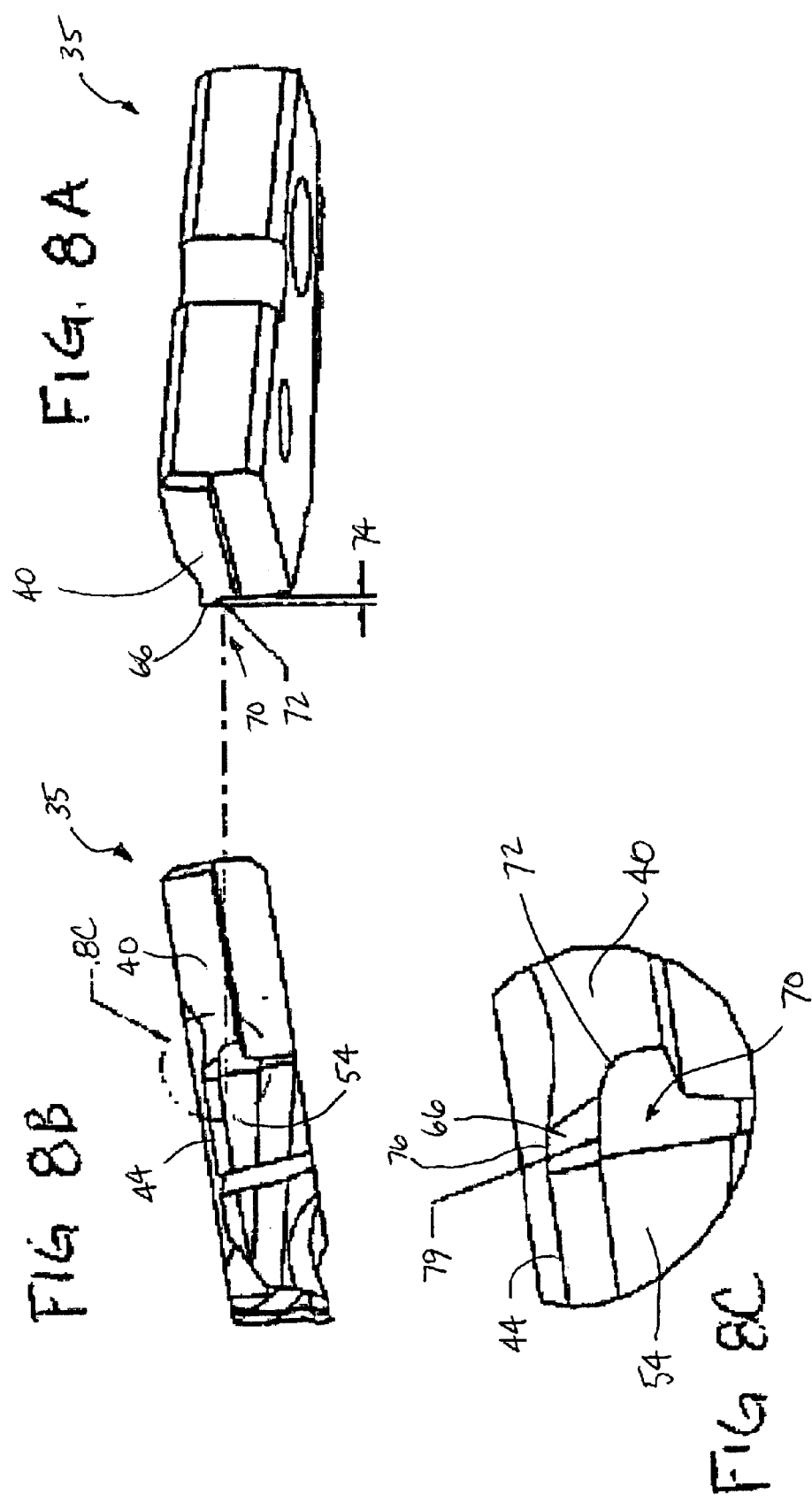

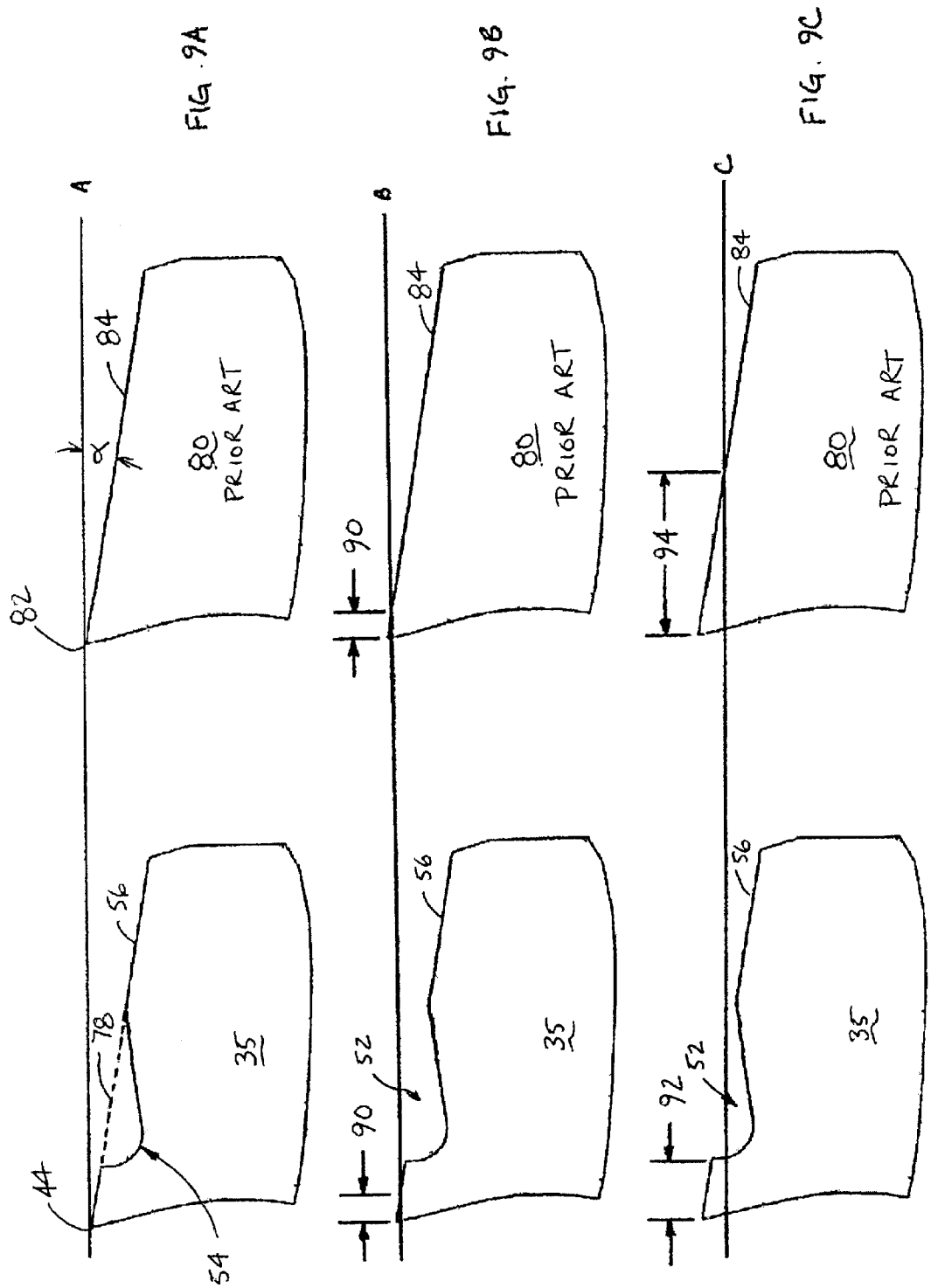

DRILL INSERT WITH CONTROLLED CONTACT CLEARANCE

TECHNICAL FIELD

The invention relates generally to a cutting insert to be placed into a tool holder for boring holes into metals. More specifically the invention relates to a cutting tool insert having a specialized geometry including a controlled contact clearance behind the cutting edge which limits flank wear and allows more coolant near the cutting edge further allowing an increase in surface speed, feed rates, and tool life.

BACKGROUND OF THE INVENTION

Drilling systems are frequently used to provide cylindrical holes in metallic workpieces. The cutting or boring action of the drill system may be carried out by an elongated, substantially cylindrical drilling tool, such as a combination of a tool holder and a drill insert, which is selectively attached thereto. Such an arrangement may then be used in an application wherein one end of the tool holder is securely mounted in a driving apparatus, which rotates the holder about its longitudinal axis. At the opposite end of the elongated tool holder, the cutting insert engages the material to be cut. Alternatively, the workpiece may be made to rotate relative to the holder and cutting insert, such as in positioning the holder in the tail stock of a lathe or the like. Further, the tool and workpiece may be made to rotate relative to one another. The use of cutting inserts allows for quick changing of the insert upon wear of the cutting surfaces instead of the entire tool, and allows for one tool to be used for a variety of different boring applications by simply changing the insert and not the entire drill assembly.

While the spade drill insert provides a significant advantage in that the insert can be thrown away once it is worn and relatively inexpensively replaced with a new insert, it would be of additional advantage to provide an insert with an extended tool life and further reduce tool costs. This is especially true of hard to cut, abrasive workpieces which quickly wear the flank and clearance of cutting insert.

SUMMARY OF THE INVENTION

The present invention provides a novel drill insert having a controlled contact clearance formed behind the cutting edges. The controlled contact clearance limits flank wear and enables more coolant near the cutting edge. These and other advantages are provided by a drill insert comprising: a drill insert body having a cutting edge; a clearance surface formed on a trailing side of the cutting edge; an undercut formed in the clearance surface at a predetermined distance from the cutting edge and at a predetermined depth in the clearance surface; wherein the remaining clearance surface between the cutting edge and the undercut provides a controlled contact clearance surface limiting the flank wear to substantially the width of the controlled contact clearance surface.

These and other objects of the invention will be apparent as disclosed in the detailed description of the drawings below.

BRIEF DESCRIPTION OF THE DRAWINGS

The invention and developments thereof are described in more detail in the following by way of embodiments with reference to the drawings, in which:

FIGS. 3A, 3B, and 3C are a variety of different views of an insert according to a first embodiment of the present invention;

FIGS. 8A, 8B, and 8C are a variety of different views of an insert according to a another embodiment of the present invention focusing on the corner treatment; and FIGS. 9A, 9B, and 9C are partial cross-sectional views showing a series of comparisons between a spade drill insert of the present invention and a prior art spade drill insert at a new condition, a first worn condition, and a second worn condition.

DETAILED DESCRIPTION OF THE INVENTION

Figure 1:
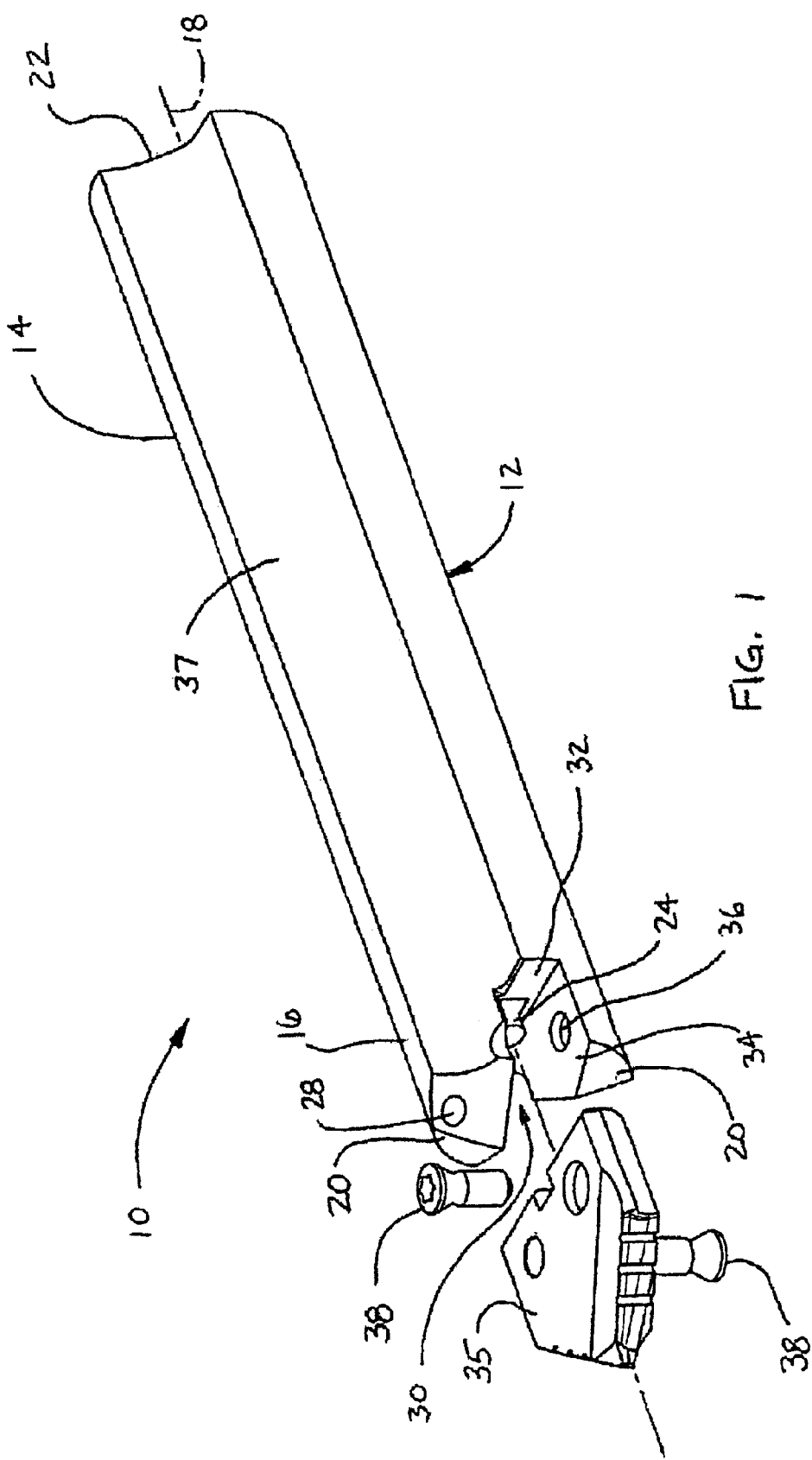
FIG. 1 is an exploded assembly view of the drill tool assembly according to a first embodiment of the present invention.

Turning now to an embodiment of the invention, FIG. 1 illustrates a drill tool assembly 10 generally indicated. Drill tool assembly 10 comprises a holder 12, which has a shank 14 and head portion 16 associated therewith. In one embodiment, holder 12 has, in general, a cylindrical shape with a first end 20 and second end 22, with the second end 22 and a portion of shank 14 adapted to be fixedly attached in a drilling machine for use. The first end 20 of holder 12 has a clamping or holder slot 30, which may extend across the entire diameter of the head portion 16 or, at least, over a center portion thereof at the general location of the rotational axis 18 of holder 12. The holder slot 30 has a bottom wall 32 positioned in substantially perpendicular orientation relative to the rotational axis 18 of the holder 12. In one embodiment, the assembly 10 may further include a locating boss or dowel pin 24, which is positioned precisely with respect to the axis 18 and extends from the bottom wall 32 of the holder slot 30. The pin 24 may be positioned within a hole 26 extending downwardly from the bottom wall 32 of slot 30 along the axis 18 of the holder body in a press fit relationship to position pin 24. Alternatively, the locating boss 24, may be configured in another manner to achieve the corresponding functionality of pin 24, such as an integral member extending from bottom wall 32. Within the holder slot 30, a drill insert 35 of the present invention is precisely positioned with respect to the holder 12 to perform the desired drilling function in conjunction therewith. As will be hereinafter described in more detail, the drill insert 35 of the present invention has a plurality of cutting surfaces which are precisely positioned with respect to the axis 18 of the holder 12 to minimize errors in drilling operation using assembly 10.

Figure 2:
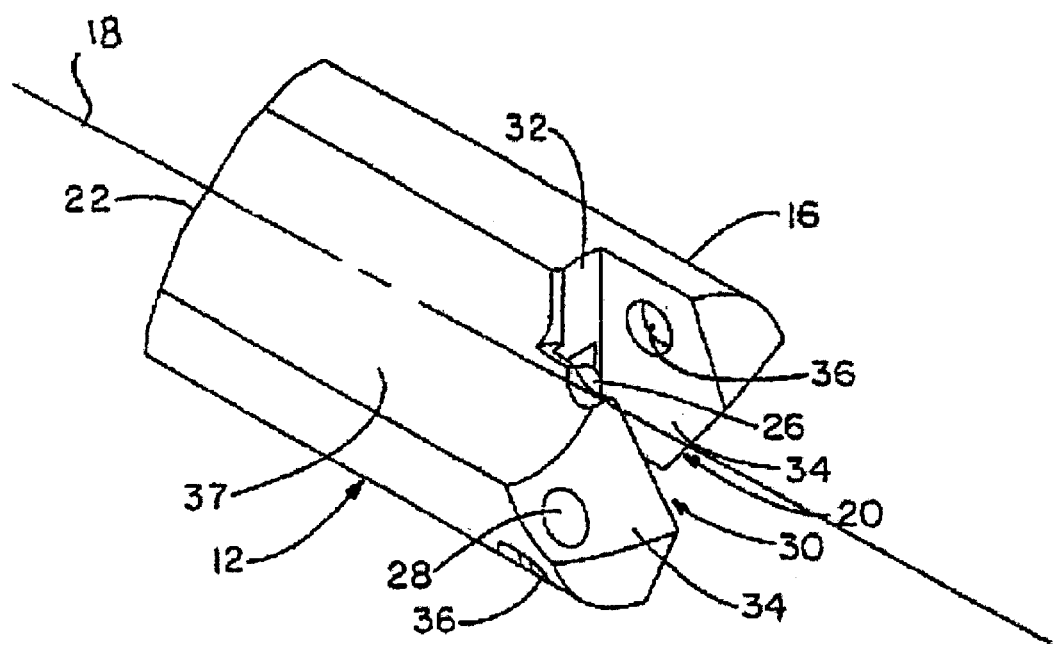
FIG. 2 is a partial perspective view of the holder associated with the assembly of FIG. 1.

More particularly, the holder 12 is shown in FIG. 2, and may be configured to include at its first end 20 a pair of clamping arms 34, which extend about holder slot 30. The clamping arms 34 preferably include apertures 36, which accommodate screws 38 (see FIG. 1) to secure the drill insert 35 in its position within the holder slot 30. In the preferred configuration, the holes 36 are threaded to engage screws 38, and mate with screw holes formed in the drill insert 35 in a predetermined manner to precisely locate the drill insert in a predetermined location within holder slot 30. Each of the clamp arms 34 may also include a lubrication vent 28, which allows the application and flow of lubrication adjacent the cutting surfaces of the drill insert to facilitate the drilling operation. The clamp arms 34 may also include angled or curved surfaces, which facilitate chip removal via chip evacuating grooves 37 on each side of the holder 12. The seating surface 32 is also shown to be designed as a planar surface, which corresponds to the planar bottom portion of the drill insert 35, although another configuration of bottom surface 32 may be employed and is contemplated herein.

Turning to FIGS. 3A–3C, a first embodiment of the drill insert 35 is shown. The drill insert 35 may form a spade drill blade, with lands or side edges 40 of the blade being generally parallel with the rotational axis 18 of the holder 12 once the insert 35 is positioned and secured with holder 12. When secured with holder 12, drill insert 35 will also have a rotational axis which desirably is coaxial with axis 18 of holder 12. The drill insert 35 will also have a width 42 which upon being rotated with holder 12 forms an outside diameter of the assembled tool. The drill insert 35 further includes cutting edges 44 on its upper surface in the form of an obtuse V-shape, with cutting edges 44 on each side of the axial center 46. The cutting edges 44 may include a plurality of cutting components which cooperate together to provide the desired cutting surface 44 for the material and/or drilling application. In general, the insert 35 is designed to cut when rotationally driven in conjunction with holder 12 in a predetermined direction, and is not reversible, although such drilling blade configurations are known to those skilled in the art and could be used in conjunction with the present invention if desired. The drill insert 35 further preferably includes apertures 48 which cooperate with the apertures 36 in clamp arms 34 to secure insert 35 within holder slot 30 and seated against seating surface 32. Additionally, insert 35 includes a locating slot 50 which allows positioning of the locating pin 24 therein.

Figure 4:
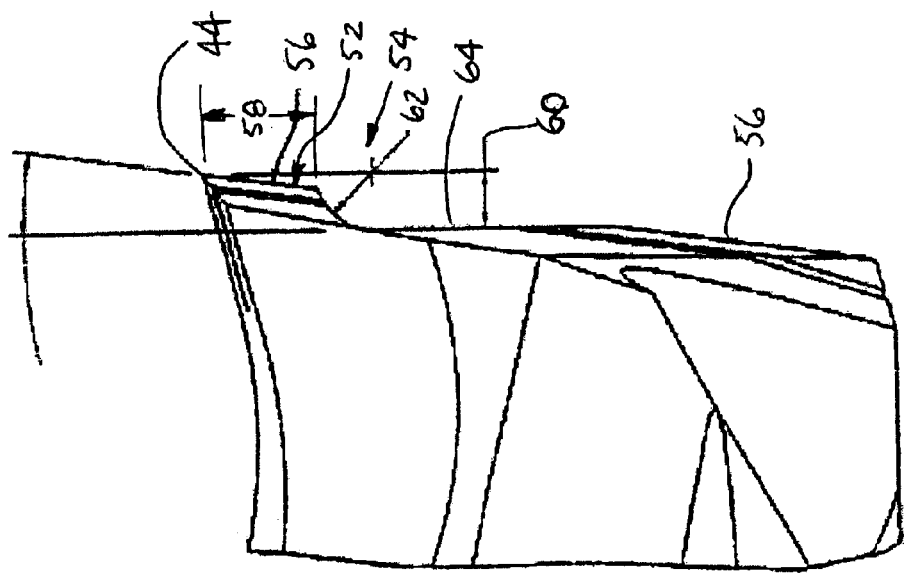
FIG. 4 is a partial cross-sectional view of the insert of FIGS. 3A, 3B, and 3C showing the undercut on the clearance surface on the insert.

As best shown in FIGS. 3B and 4, insert 35 comprises a controlled clearance surface 52. The controlled clearance surface 52 may be formed by an undercut 54 in a primary clearance surface 56 at a predetermined distance 58 behind the cutting edge 44. Distance 58 is determined by the application and the strength of the drill insert material. The depth 60 of the undercut 54 is also determined by the application and the strength of the drill insert material. It is important to know how wide of a wear land the tool can bear before catastrophic failure occurs.

Figure 7:
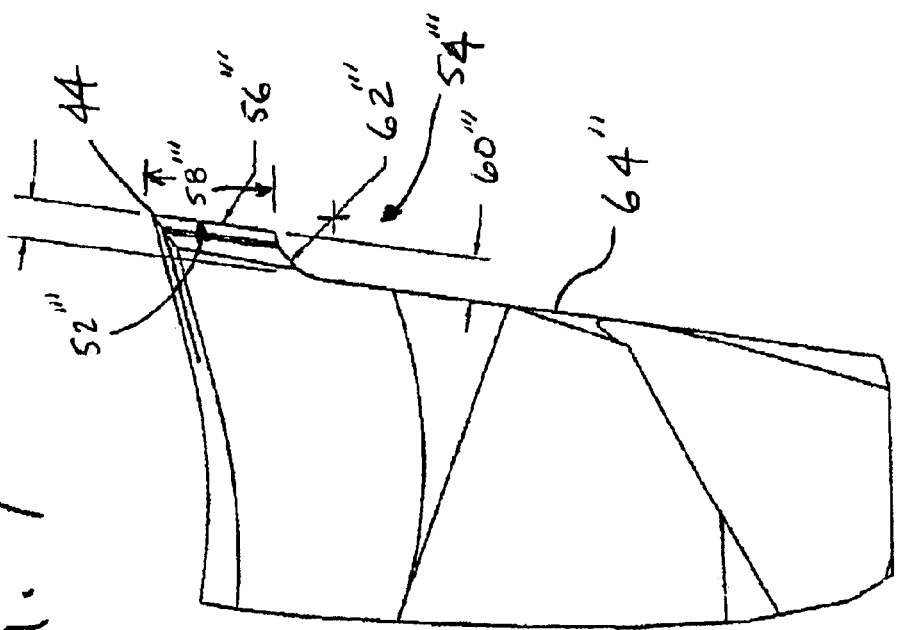
FIG. 7 is a partial cross-sectional view of a fourth embodiment of the present invention showing a variation of the undercut on the clearance surface on the insert.

The undercut 54 can have any desired form, however, a radius 62 and/or angled relief 64 provide the best combination of clearance without significant loss of strength to the cutting edge 44. Referring to FIG. 4, the radius 62 blends into an angled relief surface 64 which extends at a clearance angle to the original primary clearance surface 56. Angled relief surface 64 is perpendicular to the sides of the insert. The radius 62 and angled surface 64 will act like an arch and lend support to the now overhanging cutting edge 44. Other examples of undercuts 54 are shown in FIGS. 5–7, however, the present invention is not intended to be limited to the examples shown herein.

Figure 5:
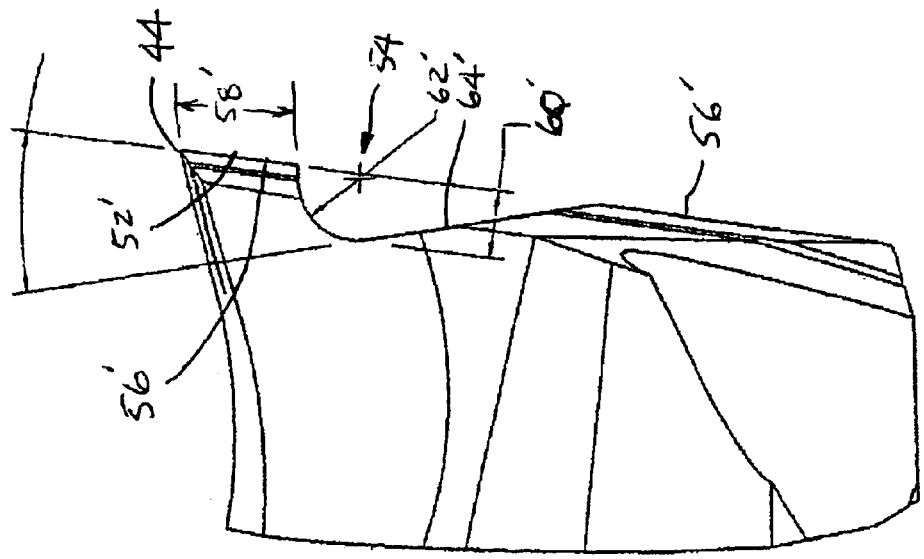
FIG. 5 is a partial cross-sectional view of a second embodiment of the present invention showing a variation of the undercut on the clearance surface on the insert.
Figure 6:
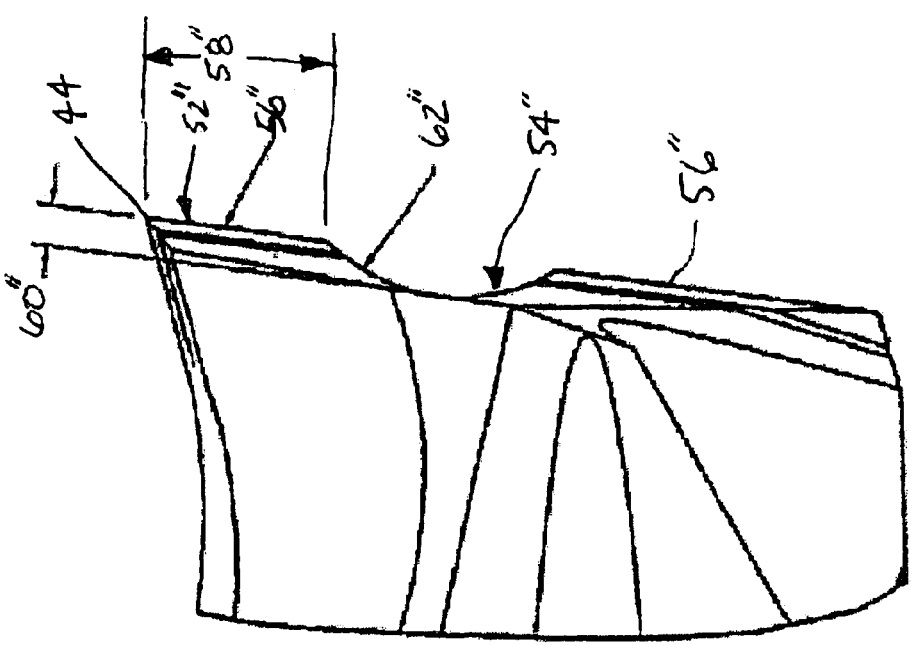
FIG. 6 is a partial cross-sectional view of a third embodiment of the present invention showing a variation of the undercut on the clearance surface on the insert.

In FIG. 5, angled surface 64' is formed at an acute angle with the thickness of the insert 35. In this configuration, more material is removed from the insert which provides more wearable tool life but provides less support underneath the cutting edge. In FIG. 6, the undercut 54" is formed as a full radius. In this configuration, typically less material is removed which provides more support underneath the cutting edge, but may provide less useable wear. In FIG. 7, the undercut 54''' is formed with the angled surface 64" parallel to the primary clearance surface 56'''. While this configuration provides the least support underneath the cutting edge, it generally provides the most useable wear.

Referring again to FIGS. 3B and 3C, the undercut 54 starts generally near the sides 40 at the corner treatment and fades out (to a depth of zero) before the web-thin 68. The tool wear deminishes towards the center of the drill due to the surface speed reduction moving radially inward along the cutting edge 44 making the undercut unnecessary toward the web-thin 68. Conversely, referring now to FIGS. 8A–8C, the undercut 54 is most important at the sides 40 at the corner treatment 66. The corner treatment 66 may be in the form of a corner clip, a corner radius, or a sharp corner. The corner treatment 66 is shown in the drawings as a corner clip for illustration purposes only and is not intended to limit the feature to a particular configuration. As shown in the figures, the corner treatment 66 may also utilize the controlled contact clearance and has a corner treatment undercut 70 formed by a corner treatment radius 72 at a corner treatment depth 74. The corner treatment undercut 70 typically is generally formed to follow the angle of the corner treatment rake face 76 in order to keep the clearance margin 79 substantially parallel. As the wear forces are highest at the corner treatment 66, the width, depth and shape of the corner treatment undercut 70 are important factors which can be optimized as the main contributor to the extended tool life.

Referring to FIG. 9A, a cross-sectional view of a portion of spade drill insert 35 having an undercut 54 as shown in the present invention is shown next to a cross-sectional view of a portion of a prior art spade drill 80. The typical prior art spade type insert 80 has a cutting edge 82. Behind the cutting edge 82, the primary clearance surface 84 drops down at an angle a from the horizontal. The clearance prevents unwanted contact between the work piece and the insert 80 and allows coolant between the clearance surface 84 and the bottom of the hole. For comparisons the insert 80 is identical to the spade drill insert 35 except for the undercut 54 forming the controlled contact clearance 56. In FIG. 9A, line A representing the bottom of the drilled hole is shown in point contact with the cutting edges 44, 82 of the inserts 35, 80. The area of the undercut 54 bounded by the phantom line 78 represents an increase in space for coolant between the drill insert flank face and the bottom surface of the hole A. When coolant is pumped through the drill into the bottom of the hole during the drilling operation, coolant is forced into that space. The result of the coolant circulating in that space has a cooling effect of the drill insert but, moreover, a cooling effect of the cutting edge. The coolant is now in a larger space, having more volume for increased heat evacuation and is in very close proximity underneath the narrow controlled contact clearance 56.

The cooling effect has a dramatic influence in surface speed, feed rate, and tool life. Tests have shown that the increased cooling available with the controlled contact clearance allows surface speeds to be increased over standard recommendations. Due to the increase in speed, the material being cut becomes hotter, more elastic and easier to cut. The chip, however, is more difficult to control due to the increased heat in the chip. Due to the increase in the heat in the chip, it is possible to increase feed rates over the standard recommendations and achieve chip control. At these increased surface speeds and feed rates, tool life will also increase dramatically from the original.

Referring again to FIG. 9A, the spade drill inserts are shown in a new condition with no wear on their flank surfaces. As the spade drill is used, flank wear will inevitably develop on the flank surfaces creating a wear land. In FIG. 9B, an initial amount of wear is signified by the movement of line B downward along the spade drill insert profiles. Line B represents the bottom of the hole with the portions of the spade drill inserts 35, 80 shown above the line being worn away. In FIG. 9B, the flank wear, represented by a wear land distance 90 for both the spade drill of the present invention and the prior art spade drill is identical. As the spade drills are used, wear continues, as represented by FIG. 9C. Line C represents the bottom of the hole with the portions of the spade drill inserts 35, 80 shown above the line being worn away. The flank wear on the spade drill insert 35 of the present invention is limited by the controlled contact clearance provided by the undercut to a wear land distance 92. However the prior art spade drill insert 80 has significant flank wear and a wear land surface 94 of approximately three times that of the insert 35 of the present invention. As the primary clearance surface 84 of the prior art insert 80 is worn away, more of the insert 80 is exposed to the workpiece creating increased friction and heat at the cutting edge, requiring reduced cutting speed and thrust, whereas the reduction in the clearance behind the cutting edge 82 prevents coolant from getting close to the cutting edge 82, further increasing the problem, which may eventually result in a catastrophic failure of the drill insert 80.

As also shown in FIG. 9C, the controlled contact clearance 56 also enables the coolant fluid to remain in the same general proximity of the cutting edge 44. Accordingly, the insert 35 can capitalize on the cooling effect and take advantage of increases in surface speed, feed rate, and tool life. The constant wear land 92 means that no increase in tool pressure is required as with prior art inserts 80. The lower pressure requirement results in less hp, thrust, torque and heat. This, in turn, results in a lesser work-hardening effect of the material being drilled which generates a better surface integrity and a better surface finish.

In another embodiment of the present invention, a diamond film coating may be used on the cutting surfaces and clearance surfaces to minimize flank wear growth. Examples of these types of films include carbon vapor deposition (CVD) polycrystalline diamond film which is well known in the industry. Diamond film coatings are,especially helpful when cutting non-metallic abrasive materials.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A drill insert comprising:
   a drill insert body having a cutting edge;
   a clearance surface formed on a trailing side of the cutting edge;
   an undercut formed in the clearance surface at a predetermined distance from the cutting edge and at a predetermined depth in the clearance surface, the undercut having a cross-section at least partially in the form of a radius;
   wherein the remaining clearance surface between the cutting edge and the undercut provides a controlled contact clearance surface limiting the flank wear to substantially the width of the controlled contact clearance surface.

2. The drill insert of claim 1, wherein the drill insert body comprises a corner treatment on an radially outward end of the cutting edge.

3. The drill insert of claim 2, wherein the corner treatment includes a corner cutting edge wherein each corner cutting edge has a corner clearance surface formed on a trailing side of the corner cutting edge;
   a corner undercut formed in the corner clearance surface at a predetermined distance from each corner cutting edge and at a predetermined depth in the corner clearance surface;
   wherein the remaining corner clearance surface between the corner cutting edge and the corner undercut provides a corner controlled contact clearance surface limiting the wear to substantially the width of the corner controlled contact clearance surface.

4. The drill insert of claim 1, wherein the drill insert body is comprised of a sintered metallic hard material.

5. The drill insert of claim 1, wherein the drill insert body is comprised of a material selected from the group consisting of carbide, cermet, ceramic, monocrystalline and polycrystalline diamond, and boron nitride.

6. The drill insert of claim 1, wherein the drill insert body is comprised of high speed steel.

7. The drill insert of claim 1, wherein the undercut having a cross-sectional geometry at least partially in the form of a radius, is formed as a continuous radius.

8. The drill insert of claim 1, wherein the undercut having a cross-sectional geometry at least partially in the form of a radius is formed such that the radius is formed at the apex of the undercut and transitioning to a straight side wall toward the clearance surface of the insert.

9. A drill insert comprising:
   a drill insert body having a cutting edge;
   a clearance surface formed on a trailing side of the cutting edge;
   an undercut formed in the clearance surface at a predetermined distance from the cutting edge and at a predetermined depth in the clearance surface;
   wherein the remaining clearance surface between the cutting edge and the undercut provides a controlled contact clearance surface limiting the flank wear to substantially the width of the controlled contact clearance surface;
   wherein the undercut has a cross-sectional geometry in the form of an angle forming a chamfer on a leading edge of the undercut wherein the chamfer is at an angle to a straight side wall on the trailing side of the undercut.

10. The drill insert of claim 8, wherein at least one of the sidewalls is perpendicular to the face sides of the drill insert body.

11. The drill insert of claim 8, wherein at least one of the sidewalls is formed generally parallel to the clearance surface.

12. The drill insert of claim 8, wherein at least one of the sidewalls is formed at an acute angle with the drill insert body thickness.

13. The drill insert of claim 1, wherein the drill insert body has at least two cutting edges inclined downwardly and outwardly from a center toward both side edges, wherein each cutting edge has at least one chip splitting groove formed transverse to the cutting edge.

14. The drill insert of claim 1, wherein at least a portion of the drill insert body is covered by a diamond film coating.

15. A drill insert comprising:
- a drill insert body having a cutting edge;
- a controlled contact clearance surface formed on a flank of the drill insert body, wherein the controlled contact clearance surface provides a first wear zone and a second wear zone;
- the first wear zone generated during operation of the drill insert allows the flank wear distance to grow from zero to the distance from the cutting edge to the controlled contact clearance surface;
- the second wear zone keeps the flank wear distance substantially constant until the controlled contact clearance surface is substantially worn away.

16. The drill insert of claim 15, wherein the drill insert body comprises a corner treatment on an radially outward end of the cutting edge, wherein the corner treatment comprises:
- a corner cutting edge wherein each corner cutting edge has a corner clearance surface formed on a trailing side of the corner cutting edge;
- a corner undercut formed in the corner clearance surface at a predetermined distance from each corner cutting edge and at a predetermined depth in the corner clearance surface;
- wherein the remaining corner clearance surface between the corner cutting edge and the corner undercut provides a corner controlled contact clearance surface limiting the wear to substantially the width of the corner controlled contact clearance surface.

17. The drill insert of claim 15, wherein the cutting edge is at the corner of the drill insert body.

18. A drilling tool assembly comprising:
- a holder having a shank portion and a head portion, the head portion having a recess formed on one end thereof;
- a drill insert body, receivable in said recess, having at least two cutting edges inclined downwardly and outwardly from a center toward both side edges;
- wherein each cutting edge has a clearance surface formed on a trailing side of the cutting edge;
- an undercut formed in the clearance surface at a predetermined distance from each cutting edge and at a predetermined depth in the clearance surface, the undercut having a cross-section at least partially in the form of a radius;
- wherein the remaining clearance surface between the cutting edge and the undercut provides a controlled contact clearance surface limiting the flank wear to substantially the width of the controlled contact clearance surface.

19. The drilling tool assembly of claim 15, wherein the drill insert body is comprised of a sintered metallic hard material.

20. The drilling tool assembly drill insert of claim 15, wherein the drill insert body is comprised of a material selected from the group consisting of carbide, cermet, ceramic, monocrystalline and polycrystalline diamond, and boron nitride.

21. The drilling tool assembly drill insert of claim 15, wherein the drill insert body is comprised of high speed steel.

* * * * *